United States Patent [19]

Nonaka

[11] Patent Number: 5,497,775
[45] Date of Patent: Mar. 12, 1996

[54] DRIVE LIMITER IN ULTRASOUND PROBE-DRIVING TRANSMITTER

[75] Inventor: Takanori Nonaka, Kyoto, Japan

[73] Assignee: Shimadzu Corporation, Kyoto, Japan

[21] Appl. No.: 127,501

[22] Filed: Sep. 28, 1993

[30] Foreign Application Priority Data

Sep. 30, 1992 [JP] Japan ................... 4-261945

[51] Int. Cl.$^6$ ........................................ A61B 8/00
[52] U.S. Cl. ........................................ 128/660.02
[58] Field of Search ............... 128/660.01, 660.02, 128/660.03, 661.02, 661.07, 661.08, 662.02

[56] References Cited

U.S. PATENT DOCUMENTS 5,233,994  8/1993  Shmulewitz .................. 128/661.08

*Primary Examiner*—George Manuel
*Attorney, Agent, or Firm*—Nikaido, Marmelstein, Murray & Oram

[57] ABSTRACT

A transmitter circuit assembly in an ultrasonic diagnostic system intermittently transmitting ultrasonic energy in bursts beamed through a probe into an organism according to control parameters defined by organic diagnostic requirements input into the circuit assembly. The transmitter circuit assembly includes a probe drive-signal output circuit driving the probe to emit ultrasonic energy; a drive voltage determining circuit determining drive signal voltage, and a circuit computing a drive voltage-limit reference voltage, both voltages being determined according to the control parameters defined by the organic diagnostic requirements; and a drive signal transmission prohibition circuit comparing the drive voltage with the reference voltage and prohibiting the drive signal from being output when the drive voltage is higher than the reference voltage. Thus if an abnormally high-voltage drive voltage is generated or in an instance In which the transmission interval is abnormally short due to hardware failure, or furthermore if abnormal control parameter values due software malfunction, or other abnormality in the transmitter circuit assembly is accordingly detected, the reference voltage is decreased; transmission of ultrasonic energy is thus prohibited, such that acoustic impact of the ultrasonic energy beamed into a patient does not exceed a limit value industry-designated for patient diagnostic safety.

17 Claims, 4 Drawing Sheets

FIG. 3

| F (cm) | A (× a mm²) | W | S | T (μs) | DCV (volts) |
|---|---|---|---|---|---|
| 3 0 | 1 0 | 1 | 1 0 0 | 3 2 0 | 1 8 0 |
| | 1 2 | 1 | 1 2 0 | 3 2 0 | 1 6 0 |
| | 1 4 | 1 | 1 4 0 | 3 2 0 | 1 5 0 |
| | ⋮ | ⋮ | ⋮ | ⋮ | ⋮ |
| 3 0 | 1 0 | 2 | 2 0 0 | 3 2 0 | 1 2 0 |
| | 1 2 | 2 | 2 4 0 | 3 2 0 | 1 1 0 |
| | 1 4 | 2 | 2 8 0 | 3 2 0 | 1 0 0 |
| | ⋮ | ⋮ | ⋮ | ⋮ | ⋮ |
| 3 0 | 1 0 | 3 | 3 0 0 | 2 4 0 | 9 0 |
| | 1 0 | 3 | 3 0 0 | 1 6 0 | 7 0 |
| | 1 0 | 3 | 3 0 0 | 1 2 0 | 6 0 |
| | 1 0 | 2 0 0 | 9 0 0 0 | 2 4 0 | 1 0 |
| | | | ⋮ | | |
| 5 0 | 1 2 | 1 | 1 1 2 0 | 3 2 0 | 1 9 0 |
| | 1 4 | 1 | 1 1 4 0 | 3 2 0 | 1 8 0 |
| | 1 6 | 1 | 1 1 6 0 | 3 2 0 | 1 7 0 |
| | ⋮ | ⋮ | ⋮ | ⋮ | ⋮ |

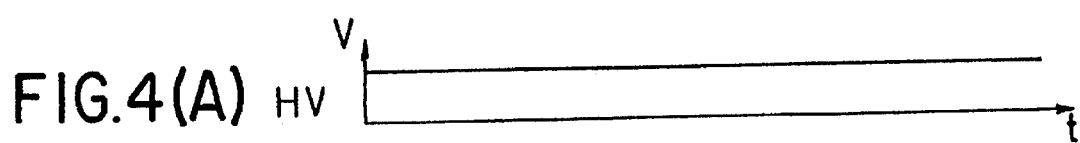
FIG.4(A) HV
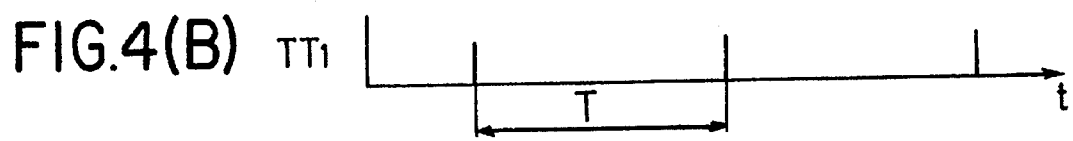
FIG.4(B) TT1
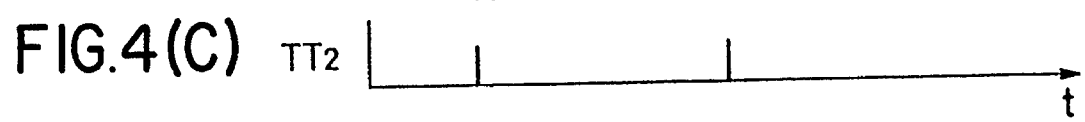
FIG.4(C) TT2
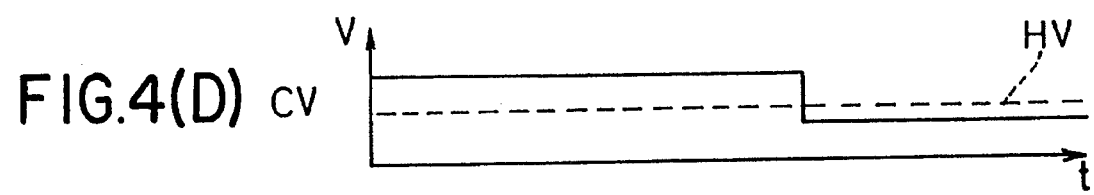
FIG.4(D) CV
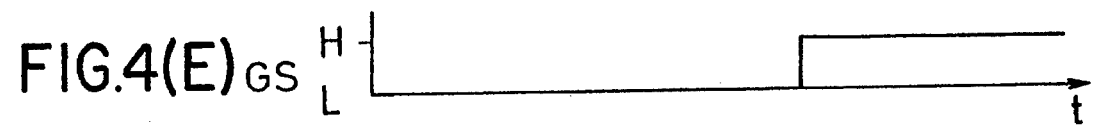
FIG.4(E) GS
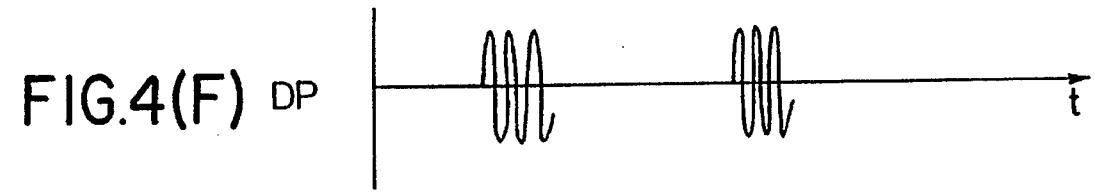
FIG.4(F) DP
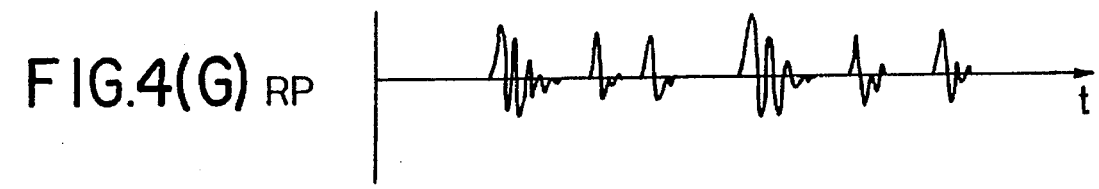
FIG.4(G) RP

5,497,775

DRIVE LIMITER IN ULTRASOUND PROBE-DRIVING TRANSMITTER

BACKGROUND OF THE INVENTION

The present invention relates to an ultrasound probe-driving transmitter driving an ultrasonic beam-emitting probe in an ultrasonic diagnostic system for obtaining diagnostic organic information by transmitting ultrasonic energy beamed into and reflected from an organism. More specifically, the invention relates to means for prohibiting the transmitter circuit assembly from driving the probe to emit ultrasonic energy which might otherwise be of excessive power in the event of malfunction in the transmitter.

Generally, ultrasonic diagnostic systems include a probe for emitting and detecting ultrasonic energy in waves beamed into and echoed from an organism, a transmitter circuit which generates pulses driving the probe, and a receiver circuit for processing the reflected ultrasonic echoes detected by the probe. The transmitter circuit includes a transmission control circuit for generating transmission interval and voltage information, a transmission trigger generation circuit for generating transmission triggers according to the transmission interval information, a transmission voltage generation circuit for generating transmission voltage corresponding to the transmission voltage information, and a drive pulse generation circuit for generating probe drive pulses. Furthermore, the transmitter circuit applies parameters Including pulse train number, beam focus depth or probe sectional drive area, transmission trigger interval and transmission voltage, to a drive pulse generation circuit, which generates drive pulses accordingly. Parameters such as pulse train number or beam focus depth are defined in software according to diagnostic mode.

In an ultrasonic diagnostic system as above, in a instance in which high-power ultrasonic waves are continually emitted in bursts into a patient organism under diagnosis, problems such as organic cavitation can occur. Therefore, care must be taken not to generate ultrasonic energy at power levels beyond diagnostic necessity. The power of the ultrasonic energy is related to emission burst frequency and ultrasound waveform factors, which are influenced by primary control parameters including voltage of pulses driving the probe, transmission trigger signal interval, probe sectional drive area (or aperture), beam focus depth and pulse train number. Thus, in conventional ultrasonic diagnostic systems, when parameter values set in the transmission control circuit by the software are applied to the pulse generation circuit, the parameter values are correspondingly set to limit the power of the ultrasonic energy waves.

In conventional systems, however, despite control of each parameter value, in the event of malfunction or aberration in the transmission voltage or the transmission trigger generation circuits, ultrasonic waves emitted at power levels injuriously beyond diagnostic necessity might be generated. For example, reduction of the transmission trigger interval due to abnormality in the transmission trigger generation circuit, or abnormal increase in the transmission voltage due to malfunction in the transmission voltage generation circuit, can result in the generation of excessive-power ultrasonic energy waves. In case there are aberrations in the software defining parametric values, moreover, excessive-power ultrasonic energy waves might be generated also.

SUMMARY OF THE INVENTION

It is an object of the present invention to prevent high-power ultrasonic waves from being generated beyond diagnostic necessity in order to improve overall safety in an ultrasonic diagnostic system.

An ultrasonic diagnostic system according to the present invention comprises an operation panel via which organic diagnostic requirements are defined as input control parameters, a transmitter circuit assembly capable of intermittently transmitting ultrasonic energy in bursts or pulses beamed through a probe into an organism according to the input parameters, and a receiver for obtaining organic information by processing a detected echo signals reflected from the organism.

The transmitter circuit assembly includes a drive signal output circuit, a drive voltage determining circuit, a limit reference voltage computing circuit and a transmission prohibition circuit. The drive signal output circuit outputs drive signals for driving the probe. The drive voltage determining circuit determines drive signal voltage through control parameters both input into the circuit assembly, and consequently derived therefrom. The limit reference voltage computing circuit computes a limit reference voltage according to the diagnostic requirements as well. The transmission prohibition circuit prohibits transmission of ultrasonic energy by comparing the drive voltage with the reference voltage and prohibiting the drive signal from being output when the driving voltage is higher than the reference voltage.

Accordingly, since malfunction or other abnormality in the transmitter circuit assembly is detected by comparing the drive voltage with the reference voltage, whereupon transmission of ultrasonic energy is prohibited, if an abnormally high-voltage drive voltage is generated due to hardware failure, transmission is prohibited, thereby preventing generation of an excess-power ultrasonic beam. Moreover, in an instance in which the transmission interval is abnormally short due to hardware breakdown, or if the control parameters have abnormal values due software malfunction, the reference voltage is decreased, whereby the transmission of ultrasonic energy is prohibited, such that emission of an excess-power ultrasonic beam is prevented.

These and other objects and advantages of the present invention will be more fully apparent from the following detailed description.

BRIEF DESCRIPTION OF THE DRAWINGS

FIG. 3 is a example table listing parametric data stored in a ROM; and

FIG. 4 is a timing chart for explaining a control operation in the ultrasound probe-driving transmission system.

DETAILED DESCRIPTION OF THE PREFERRED EMBODIMENT

Figure 1:
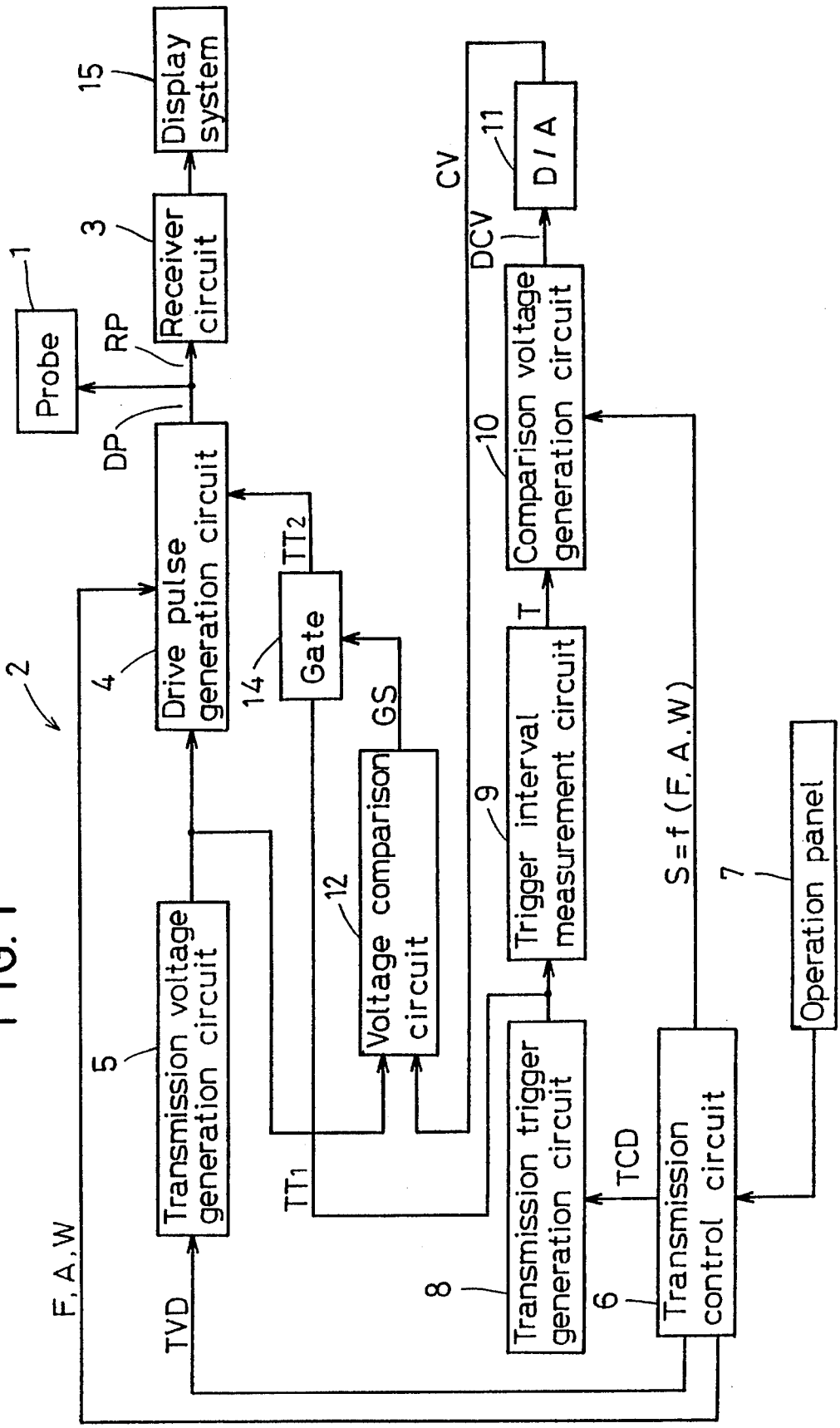
FIG. 1 is a schematic block diagram illustrating an ultrasound probe-driving transmission system according to an embodiment of the present Invention.

FIG. 1 Illustrates an ultrasonic Doppler diagnostic system according to an embodiment of the present invention.

The ultrasonic diagnostic system chiefly comprises a probe 1 containing an array of microtransducers which emit and receive ultrasonic waves in a focusable beam, a transmitter circuit assembly 2 which outputs drive pulses DP driving the probe 1, a receiver circuit 3 which receives reflected echo signals detected through the probe 1, processing the signals through phase detection and like operations, and a display system 15 consisting of a digital scan converter and a monitor.

The transmitter circuit assembly 2 includes a transmission control circuit 6 containing a microcomputer. An operation panel 7 is connected to the transmission control circuit 6. For setting diagnostic mode, beam focal position, sample volume position or the like in the Doppler mode, the operation panel 7 includes various input keys and a dial. Connected to the transmission control circuit 6 is a drive pulse generation circuit 4, a transmission voltage generation circuit 5, a transmission trigger generation circuit 8 and a comparison voltage generation circuit 10. The transmission control circuit 6 outputs to the drive pulse generation circuit 4 parameters such as probe sectional drive area (hereinafter referred to as simply "aperture area") A, beam focus depth F, and pulse train number (i.e., the number of pulses exciting a single burst of ultrasound) W which are set according to, for example, diagnostic mode or focal position. According to diagnostic requirements set thus, the transmission control circuit 6 outputs voltage data TVD to the transmission voltage generation circuit 5 such that the power of the ultrasonic bursts does not exceed a predetermined value; and it also outputs trigger interval control data TCD, determined by the set diagnostic sampling rate (frequency of ultrasonic bursts emitted per second), to the transmission trigger generation circuit 8. The transmission control circuit furthermore outputs defined-value data S to the comparison voltage generation circuit 10.

The defined-value data S is a function f (F,A,W) of the beam focus depth F, the aperture area A (the integral multiple of the emission area a of each microtransducer driven during a single burst) and the pulse train number W, examples of which are listed in the table of FIG. 3. The data table is stored in a ROM 22 to be described later, and the FIG. 3 example also tabulates data from which a digitalized comparison voltage DCV is derived using the defined-value data S and the trigger interval data T. Generally, wherein the depth of the beam focus depth F is decreased, and the aperture area A and the pulse train number are increased, the power of the ultrasonic bursts increases.

The transmission voltage generation circuit S generates, in conformity with the transmission voltage data TVD, a pulse voltage (transmission voltage) HV for the pulses driving the probe 1 and applies it to the drive pulse generation circuit 4, and to a voltage comparison circuit 12 as well. The transmission trigger generation circuit 8 applies a transmission trigger signal TT1, which determines a drive pulse-generation timing according to the trigger interval control data TCD, to a trigger interval measurement circuit 9 and a gate 13. The trigger interval measurement circuit 9 measures the transmission trigger TT1 signal interval and outputs the result as measured trigger interval data T to the comparison voltage generation circuit 10. The comparison voltage generation circuit 10 generates digitalized comparison voltage data DCV from the trigger interval data T and the defined-value data S output from the transmission control circuit 6. A D/A converter 11, connected to the comparison voltage generation circuit 10, converts the digitalized comparison voltage data DCV generated by the comparison voltage generation circuit 10 into an analog comparison voltage CV and applies it to the voltage comparison circuit 12. The voltage comparison circuit 12 compares the transmission voltage HV with the comparison voltage CV. Wherein the transmission voltage HV is higher than the comparison voltage CV, a gate signal GS output to the gate 13 goes to "H" level. Receipt by the gate 13 of the gate signal GS at "H" level closes the gate 13 and cuts the transmission trigger signal TT1.

Figure 2:
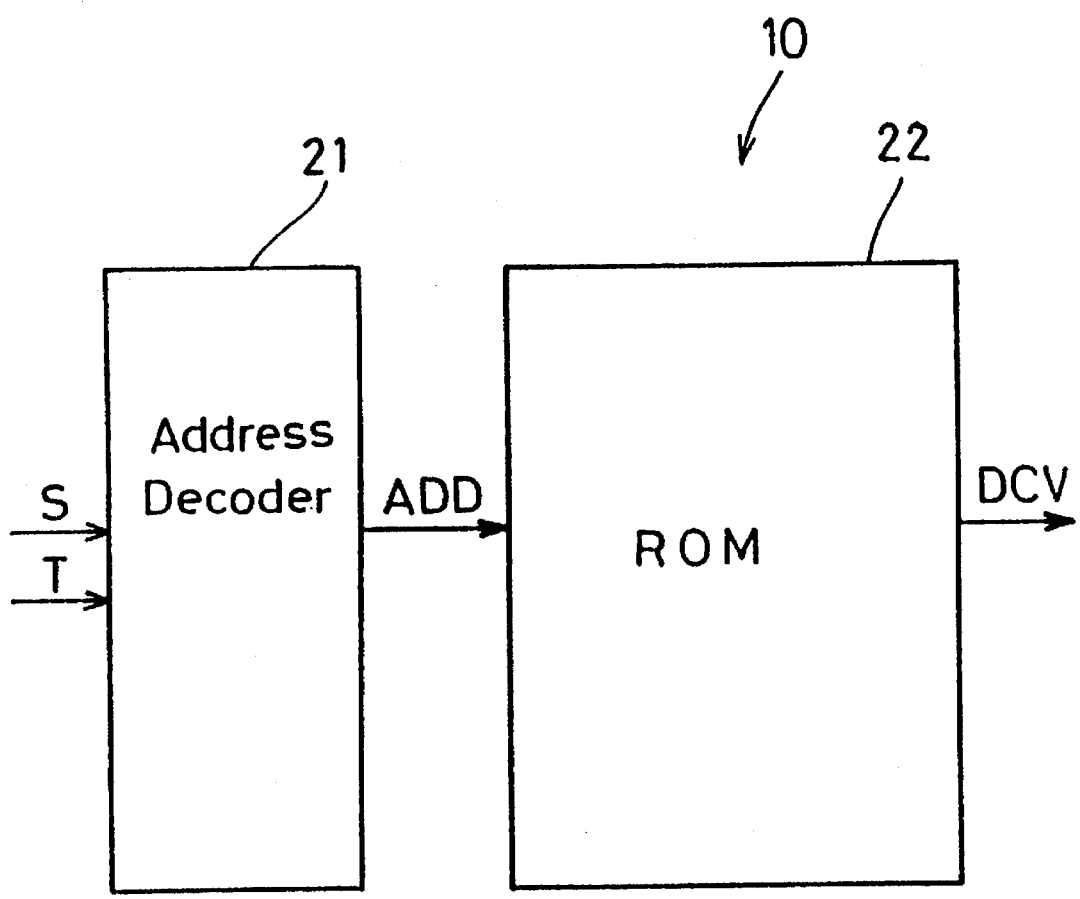
FIG. 2 is a schematic block diagram of a comparison voltage generation circuit.

The comparison voltage generation circuit 10 includes an address decoder 21 and a ROM 22, as diagramed in FIG. 2. The defined-value data S and the trigger interval data T are output to the address decoder 21, which accordingly outputs an address ADD to the ROM 22 for accessing digitalized comparison voltage DCV data stored In the ROM 22, determined by the defined-value data S and the trigger interval data T. Each type of data stored in the ROM 22 is included in the FIG. 3 table. As is evident from FIG. 3, as the trigger interval T drops, the digitalized comparison voltage DCV decreases. Furthermore, wherein the defined value of the data S is abnormal (as for example in FIG. 3, S=9000), the digitalized comparison voltage DCV is decreased. Thus, the generation of excessive-power ultrasonic bursts due to abnormality in hardware or software is prevented.

Next, operation as regards the above-described embodiment of the present Invention will be discussed following the timing chart of FIG. 4.

When power is switched on and values indicating the diagnostic mode, focal position, sample volume position, diagnostic sampling rate, etc. are input from the operation panel 7, values corresponding to the voltage data TVD, the parameters F, A and W, the trigger interval data TCD, and the defined value data S are output from the transmission control circuit 6 to the transmission voltage generation circuit 5, the drive pulse generation circuit 4, the transmission trigger generation circuit 8, and the comparison voltage generation circuit 10, respectively. The voltage data TVD is applied to the transmission voltage generation circuit 5 in conformity with the diagnostic requirements, such that the power of the ultrasonic bursts does not exceed a predetermined value. Referring to FIG. 4(A), the transmission voltage HV is output from the transmission voltage generation circuit 5 according to the obtained voltage data TVD. In addition, the transmission trigger TT1 [referring to FIG. 4(B)] is generated by the transmission trigger generation circuit 8 according to the trigger interval data TCD, and the transmission trigger TT1 is applied to the trigger interval measurement circuit 9, as well as to the gate 13. Furthermore, the transmission trigger TT1 signal interval is determined by the set diagnostic sampling rate. Tile trigger signal interval is measured in the trigger interval measurement circuit 9 by successive transmission triggers TT1, and the measured trigger interval data T is output to the address decoder 21 of the comparison voltage generation circuit 10.

Meanwhile, the defined-value data S from the transmission control circuit 6 is also output to the address decoder 21 of the comparison voltage generation circuit 10 as described above. When the trigger interval data T and the defined-value data S are output to the address decoder 21, the address data ADD is supplied; subsequently digitalized comparison voltage data DCV is output from the ROM 22 of the comparison voltage generation circuit 10 following from the address data ADD. The digitalized comparison voltage data DCV is converted to the comparison voltage CV shown in FIG. 4(D) by the D/A converter 11. In the example Illustrated therein, ensuing diagnostic requirements having a different focal position being input via the operation panel 7, the parameters are changed during diagnosis, as is the comparison voltage CV, at a timing t1.

Normally, when the diagnostic requirements are changed, the data output to the transmission voltage generation circuit 5 is also changed such that the transmission voltage HV is accordingly modified. In an instance in which an appropriately modified transmission voltage HV is not produced In response to new diagnostic requirements, however, due to circuit malfunction, transmission of the ultrasonic bursts is prohibited as follows.

Specifically, first, the obtained comparison voltage CV is compared with the transmission voltage HV in the voltage comparison circuit 12. Then, as FIG. 4(E) shows, wherein the transmission voltage HV is lower than the comparison voltage CV, the gate signal GS at "L" level is output; however, wherein due to abnormality it Is higher, the gate signal GS at "H" level is output. With the gate signal GS at "L" level, the gate 13 is open, such that the drive pulse DP is output and the ultrasonic bursts are transmitted. But when the gate signal GS goes to "t" level, the gate 13 closes. Therefore, the transmission trigger TT2 output from the gate 13 is cut, as illustrated in FIG. 4(C), after the timing t1 at which the comparison voltage CV is changed [FIG. 4(D)]. Thus, as FIG. 4(F) shows, the drive pulse DP is not output from the drive pulse generation circuit 4 after the timing t1, such that reflected echo pulses RP are not further received, as indicated in FIG. 4(G).

In this embodiment of the present invention, since abnormality in the circuits is detected by comparing the comparison voltage CV with the transmission voltage HV, and the drive pulse DP is prohibited from being generated when abnormality is detected, in the event of malfunction in the transmission voltage generation circuit 5, excessive-power ultrasonic waves are not output.

In addition, when an abnormal parameter (for example, S= 9000 in FIG. 3) is output to the comparison voltage generation circuit 10 due a software problem in the transmission control circuit 6, a small value is output as the digitalized comparison voltage data DCV. Consequently, the drive pulse DP is halted and excessive-power ultrasonic waves are prevented from being output.

Modifications (a) Although a ROM is used in the comparison voltage generation circuit 10 according to the above embodiment of the present invention, a RAM or other arithmetic unit/register may be used.

(b) Although the trigger interval measurement circuit 9, the comparison voltage generation circuit 10 and the voltage comparison circuit 12 are hardware in the above embodiment of the present invention, their functions may be effected by software.

(c) Although an ultrasonic Doppler diagnostic system is described in the foregoing embodiment of the present invention, the present invention can be also implemented in an ultrasonic diagnostic system displaying in conventional B-mode or M-mode imaging.

(d) When the defined-value data S is determined, ultrasound transmission waveform may be considered in addition to the beam focus depth F, the aperture area A and the pulse train number W.

(e) Although one specified data table is stored in the ROM 22 of the comparison voltage generation circuit 10 in the above embodiment of the present invention, since the limit value of the emitted power of the ultrasonic waves will vary with the circumstances in which the system is used, a plurality of data tables may be prepared to suit use requirements.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. In an ultrasonic diagnostic system comprising an ultrasonic beam-emitting probe, an ultrasonic probe-driving transmitter circuit assembly for driving the probe to emit an ultrasound beam controllable according to patient diagnostic requirements by input to a transmission control circuit of the assembly defining control parameters, said transmitter circuit assembly comprising:

drive signal output means for generating a drive signal output to said probe, driving said probe to emit ultrasonic energy;

drive voltage determining means for determining drive signal output voltage defined, by said control parameters according to said diagnostic requirements;

limit reference voltage generating means for computing a reference voltage for limiting said drive voltage defined by said control parameters according to the given diagnostic requirements; and drive signal prohibiting means, comparing said drive signal output voltage with said limit reference voltage, for prohibiting said drive signal output of said drive signal output means to said probe in case said drive signal output voltage is greater than said limit reference voltage.

2. An ultrasonic probe-driving transmitter circuit assembly according to claim 1, wherein said drive signal output to said probe by said drive signal output means is pulsed, such that said probe is driven by said drive signal to emit ultrasonic energy intermittently; and said ultrasonic energy being emitted by said probe is beamed into a patient organism under diagnosis.

3. An ultrasonic probe-driving transmitter circuit assembly according to claim 2, wherein said probe contains ultrasonic energy-emitting means driven sectionally by said transmitter circuit assembly for controlling emission of ultrasonic energy from said probe as a focusable beam; and said drive voltage determining means determines said drive signal output voltage according to control parameters comprising:

probe sectional drive area;

beam focus depth; and a number counting drive pulse signals required to excite a single burst of ultrasonic energy;

said control parameters being defined by said drive voltage determining means such that acoustic impact of said ultrasonic energy beamed into said patient organism, as determined by said drive signal output voltage, does not exceed a limit value industry-designated for patient diagnostic safety.

4. An ultrasonic probe-driving transmitter circuit assembly according to claim 3, wherein said limit reference voltage generating means comprises:

pulse interval-measuring means for measuring inter-pulse interval data of said drive signal;

control data computing means for computing defined-value control data as a function of at least one of said control parameters defined according to said given diagnostic conditions; and a limit reference voltage generation circuit generating a limit reference voltage determined by said inter-pulse interval data and said defined-value control data.

5. An ultrasonic probe-driving transmitter circuit assembly according to claim 4, wherein said limit reference voltage generation circuit comprises:

an address decoder for receiving said inter-pulse interval data and said defined-value control data and accordingly generating address data; and storage means storing limit reference voltage data, for select output of said limit reference voltage data accessed by address data received from said address decoder.

6. An ultrasonic probe-driving transmitter circuit assembly according to claim 5, wherein stored in said storage means is data established such that said limit reference voltage is decreased wherein said defined-value control data expresses an abnormal value Indicating corresponding drive signal output voltage in excess of said limit value industry-designated for patient dianostic safety.

7. An ultrasonic probe-driving transmitter circuit assembly according to claim 4, wherein said defined-value control data computing means computes defined-value data from control parameters including said probe sectional drive area, said beam focus depth and said number counting drive pulse signals required to excite a single burst of ultrasonic energy.

8. An ultrasonic probe-driving transmitter circuit assembly according to claim 7, wherein a pulse trigger signal determines pulse generation timing of said drive signal; and said drive pulse signal interval-measuring means measures an inter-signal interval of said pulse trigger.

9. An ultrasonic probe-driving transmitter circuit assembly according to claim 3, wherein said drive signal output means comprises:

a drive pulse signal-generation circuit for generating a drive pulse signal driving said probe to emit ultrasonic energy; and a transmission trigger-signal generation circuit for applying to said drive pulse signal-generation circuit a trigger signal determining pulse timing of said drive pulse signal as generated by said drive pulse signal-generation circuit.

10. An ultrasonic probe-driving transmitter circuit assembly according to claim 9, wherein said limit reference voltage determining means comprises:

trigger interval measuring means for measuring an inter-trigger interval of said transmission trigger signal;

control data computing means for computing defined-value control data as a function of at lease one of said control parameters defined according to said given diagnostic conditions; and a limit reference voltage generation circuit generating a limit reference voltage determined by said drive pulse inter-signal interval and said defined-value control data.

11. An ultrasonic probe-driving transmitter circuit assembly according to claim 10, wherein said transmission prohibiting means comprises:

voltage comparing means for comparing said drive voltage with said limit reference voltage; and a gate circuit for prohibiting said transmission trigger signal from being applied to said drive pulse signal-generation circuit when said drive voltage Is higher than said limit reference voltage.

12. An ultrasonic diagnostic system for beaming ultrasonic energy into an organism under diagnosis in order thereby to obtain organic Information, comprising:

diagnostic requirement input means for defining diagnostic requirements via input into the ultrasonic diagnostic system;

transmitting means including an ultrasonic beam-emitting probe, for transmitting focusable ultrasonic bursts into said organism intermittently through said probe; and receiving means for receiving reflected ultrasonic signals from which organic information is detected, echoed from said organism;

said transmitting means comprising:

drive signal output means for generating a drive signal output to said probe, driving said probe to emit ultrasonic energy;

drive voltage determining means for determining drive signal output voltage defined by said control parameters according to diagnostic requirements defined by said diagnostic requirement input means;

limit reference voltage generating means for computing a reference voltage for limiting said drive voltage defined by said control parameters according to the given diagnostic requirements; and drive signal prohibiting means, comparing said drive signal output voltage with said limit reference voltage, for prohibiting said drive signal output of said drive signal output means to said probe in case said drive signal output voltage is greater than said limit reference voltage.

13. An ultrasonic diagnostic system according to claim 12, wherein said probe contains ultrasonic energy-emitting means driven sectionally by said transmitter circuit assembly for controlling emission of ultrasonic energy from said probe as a focusable beam; and said drive voltage determining means determines said drive signal output voltage according to control parameters comprising:

probe sectional drive area;

beam focus depth; and a number counting drive pulse signals required to excite a single burst of ultrasonic energy;

said control parameters being defined by said drive voltage determining means such that acoustic impact of said ultrasonic energy beamed into said patient organism, as determined by said drive signal output voltage, does not exceed a limit value industry-designated for patient diagnostic safety.

14. A probe-driving transmitter circuit assembly in an ultrasonic diagnostic system according to claim 13, wherein said limit reference voltage generating means comprises:

pulse interval-measuring means for measuring inter-pulse interval data of said drive signal;

control data computing means for computing defined-value control data as a function of at least one of said control parameters defined according to said given diagnostic conditions; and a limit reference voltage generation circuit generating a limit reference voltage determined by said inter-pulse interval data and said defined-value control data.

15. A probe-driving transmitter circuit assembly in an ultrasonic diagnostic system according to claim 14, wherein said drive signal output means comprises:

a drive pulse signal-generation circuit for generating a drive pulse signal driving said probe to emit ultrasonic energy; and a transmission trigger-signal generation circuit for applying to said drive pulse signal-generation circuit a trigger signal determining pulse timing of said drive pulse signal as generated by said drive pulse signal-generation circuit.

16. A probe-driving transmitter circuit assembly in an ultrasonic diagnostic system according to claim 15, wherein said limit reference voltage determining means comprises:

trigger interval measuring means for measuring an inter-trigger interval of said transmission trigger signal;

control data computing means for computing defined-value control data as a function of at least one of said control parameters defined according to said given diagnostic conditions; and a limit reference voltage generation circuit generating a limit reference voltage determined by said drive pulse inter-signal interval and said defined-value control data.

17. A probe-driving transmitter circuit assembly in an ultrasonic diagnostic system according to claim 16, wherein said transmission prohibiting means comprises:

voltage comparing means for comparing said drive voltage with said limit reference voltage; and a gate circuit for prohibiting said transmission trigger signal from being applied to said drive pulse signal-generation circuit when said drive voltage is higher than said limit reference voltage.

* * * * *